United States Patent Office

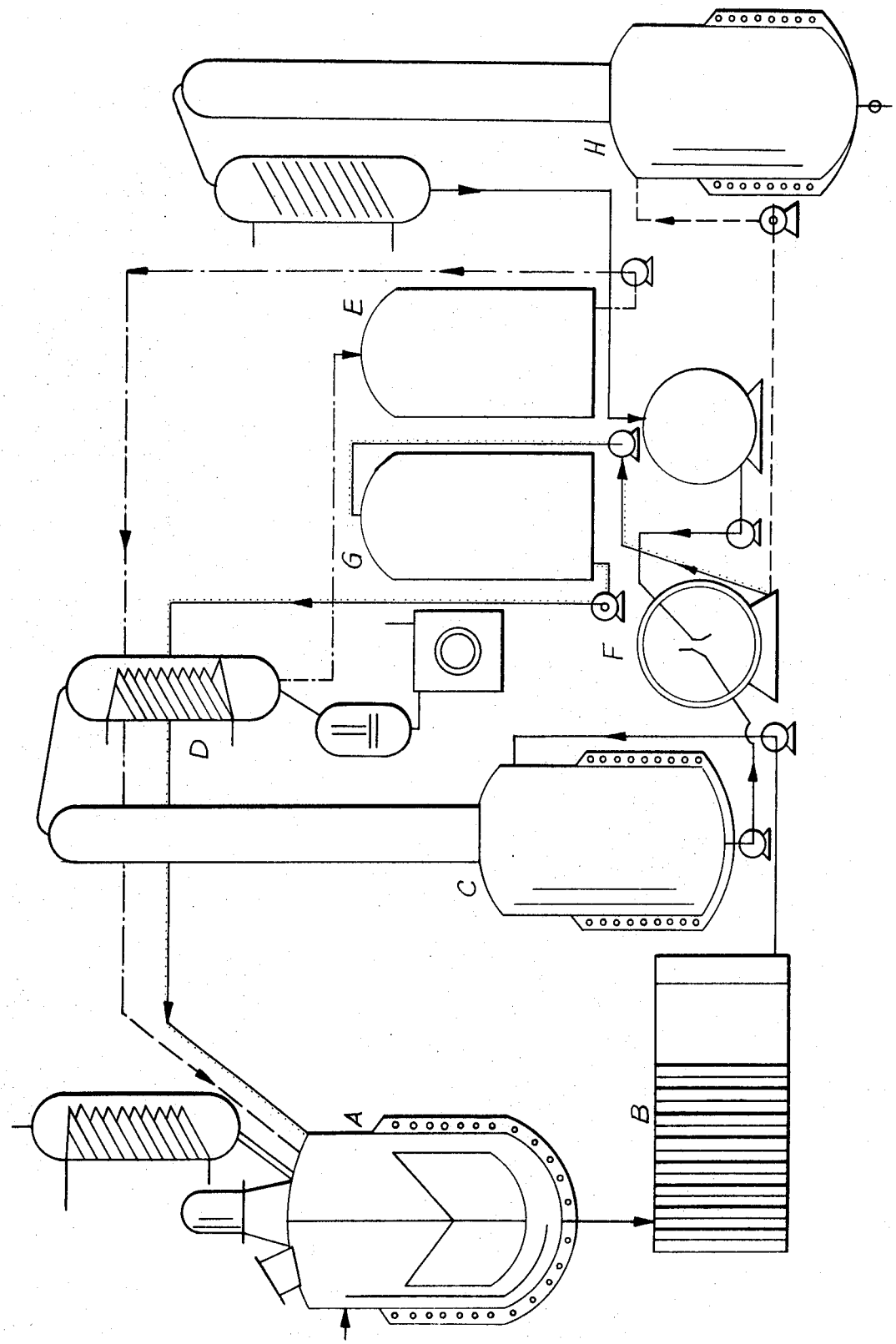

3,655,748
Patented Apr. 11, 1972

3,655,748
SYNTHESIS OF ε-AMINOCAPROIC ACID
FROM ε-CAPROLACTAM
Milan Tandara, Sarajevo, Yugoslavia, assignor to
Bosnalijek, Sarajevo, Yugoslavia
Filed Apr. 29, 1969, Ser. No. 820,069
Claims priority, application Yugoslavia, Dec. 26, 1968,
P 3,106
Int. Cl. C07c *101/04, 99/06*
U.S. Cl. 260—534 R          10 Claims

ABSTRACT OF THE DISCLOSURE

ε-Aminocaproic acid is produced by the hydrolytic decomposition of ε-caprolactam wherein a mixture of the lactam and $Ba(OH)_2 \cdot 8H_2O$ is dissolved in a mixed solvent consisting of water and dimethylsulfoxide (DMSO). The barium salt of the acid which is formed is then converted to the free acid by adding gaseous carbon dioxide which forms insoluble $BaCO_3$.

BACKGROUND OF THE INVENTION

The known methods for the synthesis of ε-aminocaproic acid consist mainly of the hydrolysis of ε-aminocaprolactam in aqueous solution using different agents such as mineral acids (hydrochloric and sulfuric), alkali and alkali earth hydroxides (sodium and calcium hydroxide) and anionic ion exchangers (Dowex and Amberlite). The existence of so many such methods is not surprising when one considers the vast field of application of ε-aminocaproic acid, such as in the production of plastics of the polyamide type, as an initiator for the polymerization of ε-caprolactam to Nylon 6, in pharmacy as an anticoagulant and in synthetic organic chemistry as an intermediate for the production of other compounds.

For practical applications, very pure acid is required, however when using the methods mentioned above, the obtained product must be recrystallized several times to attain an acceptable level of purity and even then in certain cases the presence of inorganic matter cannot be avoided. In the literature there are also mentioned special complex methods for the production of very pure ε-aminocaproic acid, which methods involve processing the crude acid, and obtaining an acid with 0.02% of ash content.

BRIEF SUMMARY OF THE INVENTION

The present invention relates to the synthesis of very pure ε-aminocaproic acid by the hydrolytic decomposition of ε-aminocaprolactam in the presence of $Ba(OH)_2 \cdot 8H_2O$ in a mixed solvent consisting of water and dimethyl sulfoxide (DMSO).

The method according to the present invention involves the hydrolytic decomposition of the lactam into the acid, in the presence of $Ba(OH)_2 \cdot 8H_2O$, in a mixed solvent consisting of water and DMSO, in which the ratio of the solvents is precisely fixed. As a result of this reaction, the barium salt of the acid is formed. Carbon dioxide is then introduced into the reaction product to liberate the acid from the barium and at the same time form insoluble barium carbonate. With such a decomposition in the presence of an alkali earth hydroxide such as $Ba(OH)_2 \cdot 8H_2O$ in a mixed solvent as described above, very good yields in terms of the conversion of lactam into acid, the duration of the reaction and the purity of the final product are obtained. The purity of the product corresponds to acid purities which are commonly designated "purissimo."

The use of a mixture of solvents having a great difference in boiling points makes it possible, after the $BaCO_3$ has been removed, to remove one of the solvents, in vacuum, at a low temperature without affecting the formed product which decomposes at higher temperatures. The acid is insoluble in the second solvent and crystallizes slowly when water evaporates or is removed in vacuum. Thus, according to the invention, when the reaction is completed, water is removed at a relatively low temperature leaving mainly DMSO. The acid is insoluble in DMSO and therefore precipitates from the DMSO.

While the acid itself is soluble only in water, all its derivatives are soluble in both solvents, thus permitting an easy separation of the acid in pure form.

There are indications that DMSO has a catalytic influence in the hydrolytic decomposition of ε-aminocaprolactam, forming an active complex therewith.

DETAILED DESCRIPTION OF THE INVENTION

According to the present invention, ε-aminocaprolactam is converted to ε-aminocaproic acid by a method in which a reactor equipped with a stirrer and reflux condenser is first filled with the solvent mixture, consisting of water and DMSO in a volume ratio of about 1:0.5 and then, while mixing the solvent, the $Ba(OH)_2 \cdot 8H_2O$ and ε-caprolactam are added. The amount of $Ba(OH)_2 \cdot 8H_2O$ relative to the ε-caprolactam should be at least the stoichiometric amount; that is, 0.5 mol of $Ba(OH)_2 \cdot 8H_2O$ per mol of ε-caprolactam. Of course, a greater amount can be used with no disadvantage to the overall process. The reaction mixture is then heated under agitation to the optimal temperature which is about 95°–105° C. and kept at this temperature for a few hours. In the course of the reaction, ε-aminocaprolactam is hydrolytically decomposed to ε-aminocaproic acid according to the following equation:

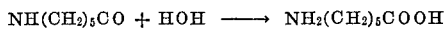

$$NH(CH_2)_5CO + HOH \longrightarrow NH_2(CH_2)_5COOH$$

The acid formed combines with the barium ions from the solution, thereby forming a salt:

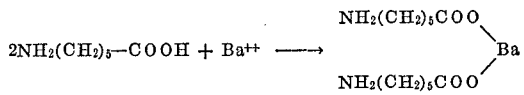

$$2NH_2(CH_2)_5-COOH + Ba^{++} \longrightarrow \underset{NH_2(CH_2)_5COO}{\overset{NH_2(CH_2)_5COO}{\diagdown\!\!\diagup}} Ba$$

When the reaction mixture in the reactor has cooled to a temperature below 60° C., usually about 45°–60° C., gaseous $CO_2$ is introduced to the mixture to form insoluble barium carbonate and the liberated free acid according to the following equation:

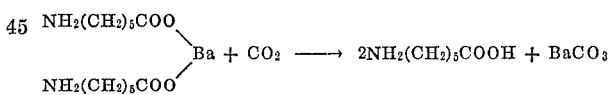

$$\underset{NH_2(CH_2)_5COO}{\overset{NH_2(CH_2)_5COO}{\diagdown\!\!\diagup}} Ba + CO_2 \longrightarrow 2NH_2(CH_2)_5COOH + BaCO_3$$

The introduction of $CO_2$ lasts for about 45 minutes, under mixing and further lowering of the temperature down to about 25° C., which enhances the formation of a precipitate which is easy to filter and which is then removed by filtration for example in a filtering press. The precipitate is washed with water (½ of the total volume of the reaction mixture). The filtrate is then transferred to a vacuum evaporator where, at a pressure of about 20–40, preferably 20–25 mm. Hg, water is evaporated and after passing through a condenser is collected in a water storage tank. During the vacuum evaporation of water, the temperature of the system is between 45 and 70°, preferably 45 and 55° C., and under these conditions, ε-aminocaproic acid crystallizes slowly from the remaining DMSO.

With strict control of the temperature conditions during the evaporation of water in vacuum the crystals formed are practically uniform in size.

The suspension of the crystals in the DMSO is cooled to about 20° C. and then separated in a centrifuge. The DMSO is then transferred by means for example of a centrifugal pump into a storage tank. The remaining crystals are washed with ethanol, which, after the washing is completed, may be transferred into a distillation unit for regeneration of the solvent. Instead of ethanol, methanol can also be used successfully for the washing. The washed crystals are then dried at a temperature of 35–60° C. and a pressure of 170–230° mm. Hg.

The barium carbonate formed in the process, which is obtained in quantitative yield, can be used as a commercial by-products of high purity.

In the next operating cycle, the DMSO, water and alcohol obtained from the washing can be used again after regeneration.

The present invention will now be further described by way of the following examples:

Example 1

A mixture of 50 g. of ε-aminocaprolactam and 66 g. of $Ba(OH_2 \cdot 8H_2O$ is dissolved with agitation in a mixed solvent consisting of 250 ml. of distilled water and 126 ml. of DMSO. The reaction mixture is heated to a temperature of about 98–102° C. and mixed under reflux at this temperature for 3 hours and 45 minutes. After cooling the reaction mixture to 55° C., gaseous $CO_2$ was introduced for the next 45 minutes, the mixture slowly cooling down to 25° C. This cooling enables the precipitation of $BaCO_3$ in a form which is easy to filter. After all the $BaCO_3$ had been precipitated, the precipitate was removed and washed with 54 ml. of distilled water (two batches each of 27 ml.). The $BaCO_3$ precipitate was washed and ground. The yield of $BaCO_3$ was quantitative From the filtrate, water was then evaporated in a vacuum evaporator.

The evaporation was performed between 45 and 55° C. During the evaporation of water, the acid crystallizes slowly from the DMSO. When the evaporation was completed, ε-aminocaproic acid was separated from the DMSO by filtration.

The crystals of ε-aminocaproic acid were washed twice with 20 ml. portions of methanol. The methenol which adheres to the crystals is removed by drying same in vacuum at a temperature of 35–45° C. and a pressure of 180–230 mm. Hg. The yield of ε-aminocaproic acid was 53.3 g.; melting point 208–210° C. The yield was 96% of the theoretical amount. The product assayed as 99.80% acid.

Example 2

A mixture of 50 g. of ε-aminocaprolactam and 66 g. of $Ba(OH)_2 \cdot 8H_2O$ was dissolved under agitation and slow heating in a mixed solvent comprising water and DMSO, making use of water and DMSO evaporated from a preceding operating cycle (250 ml. of $H_2O$ and 120 ml. of DMSO). The reaction mixture was heated to a temperature of about 95–103° C. and kept refluxing at this temperature under agitation for 3 hours and 50 minutes. After cooling the reaction mixture to 45° C., in the course of the next 45 minutes, gaseous $CO_2$ was introduced, under further agitation and cooling. During this stage of the reaction, $BaCO_3$ in a form which is easy to filter was obtained. The $BaCO_3$ was separated by filtration and washed twice with 27 ml. of distilled water. The $BaCO_3$ was dried and ground. The yield of $BaCO_3$ was quantitative. From the obtained filtrate, water is evaporated in vacuum, at a temperature of 50–70° C. and a pressure of 30–40 mm. Hg. The formed crystals of ε-aminocaproic acid were separated from the DMSO by filtration. The acid was washed with ethanol (two batches of 30 ml. of ethanol).

The crystals were than dried in vacuum at a temperature of 50–60° C., and a pressure of 170–200 mm. Hg. There were obtained 54.8 g. of ε-aminocaproic acid, melting at 208–210° C. The yield was 99.1% of the theoretical amount. The assay of acid was 99.75%.

Example 3

A mixture of 300 g. of ε-aminocaprolactam and 396 g. of $Ba(OH)_2 \cdot 8H_2O$ is dissolved under mixing and heating in a mixture of solvents, consisting of 1500 ml. of tap water and 660 ml. of DMSO. The reaction mixture is heated to a temperature of 88–102° C. and left to reflux at this temperature for 4 hours and 20 minutes, under agitation. When the reaction mixture has cooled to 60° C., gaseous $CO_2$ is introduced for the next 45 minutes, under mixing and gradual cooling. In this stage of the process, the $BaCO_3$ which slowly separates is of a structure which permits easy filtration. The precipitate is separated by filtration and washed with tap water (two batches of 150 ml.) and then dried and ground. As such, this $BaCO_3$ is very pure. From the filtrate, water is evaporated in a vacuum evaporator, at a temperature of 50–60° C. and a pressure of 25–30 mm. Hg.

The crystals of ε-aminocaproic acid which form in the DMSO are separated from the DMSO by filtration. The acid is washed with ethanol (two batches of 120 ml. of 96% alcohol). The residual alcohol remaining in the product is removed by drying in vacuum at a temperature of 50–60° C. and a pressure of 200–210 mm. Hg. Thereby, 328 g. of ε-aminocaproic acid is obtained which melts at 207–209° C. The yield is 98% of the theoretical amount.

Example 4

Into a mixture of 36.2% by weight of DMSO and 63.8% by weight of $H_2O$, under agitation, stoichiometric quantities of $Ba(OH)_2 \cdot 8H_2O$ and ε - aminocaprolactam (0.51 mole of $Ba(OH)_2 \cdot 8H_2O$ per mole of caprolactam) were introduced and the reaction mixture was heated to the optimal temperature of 98–102° C. under mixing, which mixing was continued for 3 hours and 45 minutes at the same temperature, to complete the reaction.

After cooling the mixture in the reactor to 45° C., gaseous $CO_2$ is introduced, insoluble barium carbonate is formed and pure acid is liberated.

The introduction of the $CO_2$ lasts for about 45 minutes, during which the reaction mixture is agitated and slowly cooled, thereby enabling the formation of a precipitate of $BaCO_3$ which is easy to filter. The precipitate is removed by filtration and washed with water (1/7 of the total volume of the reaction mixture). Then, at a pressure of 20–25 mm. Hg and a temperature of 45–55° C., water is evaporated from the filtrate, and ε-aminocaproic acid slowly crystallizes from the DMSO, because of its insolubility therein. The mixture of crystals in DMSO is cooled to 20° C. and then separated by centrifugation.

The remaining crystals are washed with 96% ethanol (1/10 of the total volume of the reaction mixture) and dried at a temperature of 35–55° C. and a pressure of about 180–220 mm. Hg, as a result of which the crystals become white and prismatic with a melting point of 208–209.5 C. The content of the acid assayed at 99.60–99.80%. The yield is between 96 and 99% of the theoretical amount.

What is claimed is:

1. A method for preparing ε-aminocaproic acid comprising reacting a mixture of ε-aminocaprolactam and $Ba(OH)_2 \cdot 8H_2O$ in a mixed solvent consisting of water and dimethylsulfoxide at a temperature of about 95°–103° C. to form the barium salt of ε-aminocaproic acid, cooling the reaction mixture to a temperature of about 45°–60° C., adding gaseous carbon dioxide to the cooled reaction mixture to liberate the free ε-aminocaproic acid and precipitate $BaCO_3$, filtering off the precipitate $BaCO_3$ to obtain a filtrate, removing water from the filtrate by vacuum evaporation to precipitate crystals of the free ε-aminocaproic acid.

2. A method as claimed in claim 1 further comprising washing the precipitated crystals of free ε-aminocaproic acid with alcohol and drying same.

3. A method as claimed in claim 1 wherein the water and dimethylsulfoxide are present in a volume ratio of about 1:0.5.

4. A method as claimed in claim 1 wherein the amount of $Ba(OH)_2 \cdot 8H_2O$ relative to the ε-aminocaprolactam is at least the stoichiometric amount of 0.5 mol of $Ba(OH)_2 \cdot 8H_2O$ per mol of ε-aminocaprolactam.

5. A method as claimed in claim 1 wherein reacting is effected for 3 to 4 hours.

6. A method as claimed in claim 1 wherein the addition of gaseous carbon dioxide is continued for about 45 minutes.

7. A method as claimed in claim 1 wherein water is removed from the filtrate at a pressure of 20–40 mm. Hg and a temperature of 45°–70° C.

8. A method as claimed in claim 7 wherein the pressure is 20–25 mm. Hg and the temperature is 45°–55° C.

9. A method as claimed in claim 2 wherein the alcohol is methanol or ethanol.

10. A method as claimed in claim 2 wherein drying of the crystals is effected at a temperature of 35°–60° C. and a pressure of 170–230 mm. Hg.

References Cited

UNITED STATES PATENTS

| 2,453,234 | 11/1948 | Koch | 260—534 |
| 2,327,119 | 8/1943 | Martin | 260—534 |

FOREIGN PATENTS

| 790,503 | 2/1958 | Great Britain | 260—534 |

OTHER REFERENCES

Advances in Organic Chemistry, Methods and Results, vol. 5, Raphael et al., pp. 2–3 (1965).

Technique of Organic Chemistry, Weissberger, vol. III (1950), pp. 410–414 and 630.

LORRAINE A. WEINBERGER, Primary Examiner

J. L. DAVISON, Assistant Examiner